(No Model.) 2 Sheets—Sheet 2.

J. A. JOHNSON & N. O. STARKS.
CORN HARVESTER.

No. 516,309. Patented Mar. 13, 1894.

Nils O. Starks,
John A. Johnson,
Inventors

Witnesses
C. C. Burduce.
Horace A. Dodge.

by Dodge Sons
Attorneys.

UNITED STATES PATENT OFFICE.

JOHN A. JOHNSON AND NILS O. STARKS, OF MADISON, WISCONSIN.

CORN-HARVESTER.

SPECIFICATION forming part of Letters Patent No. 516,309, dated March 13, 1894.

Application filed November 20, 1893. Serial No. 491,432. (No model.)

*To all whom it may concern:*

Be it known that we, JOHN A. JOHNSON and NILS O. STARKS, citizens of the United States, residing at Madison, in the county of Dane and State of Wisconsin, have invented certain new and useful Improvements in Corn-Harvesters, of which the following is a specification.

Our invention relates to machines designed more particularly for harvesting corn, and consists in various novel features hereinafter set forth and claimed.

Figure 1:
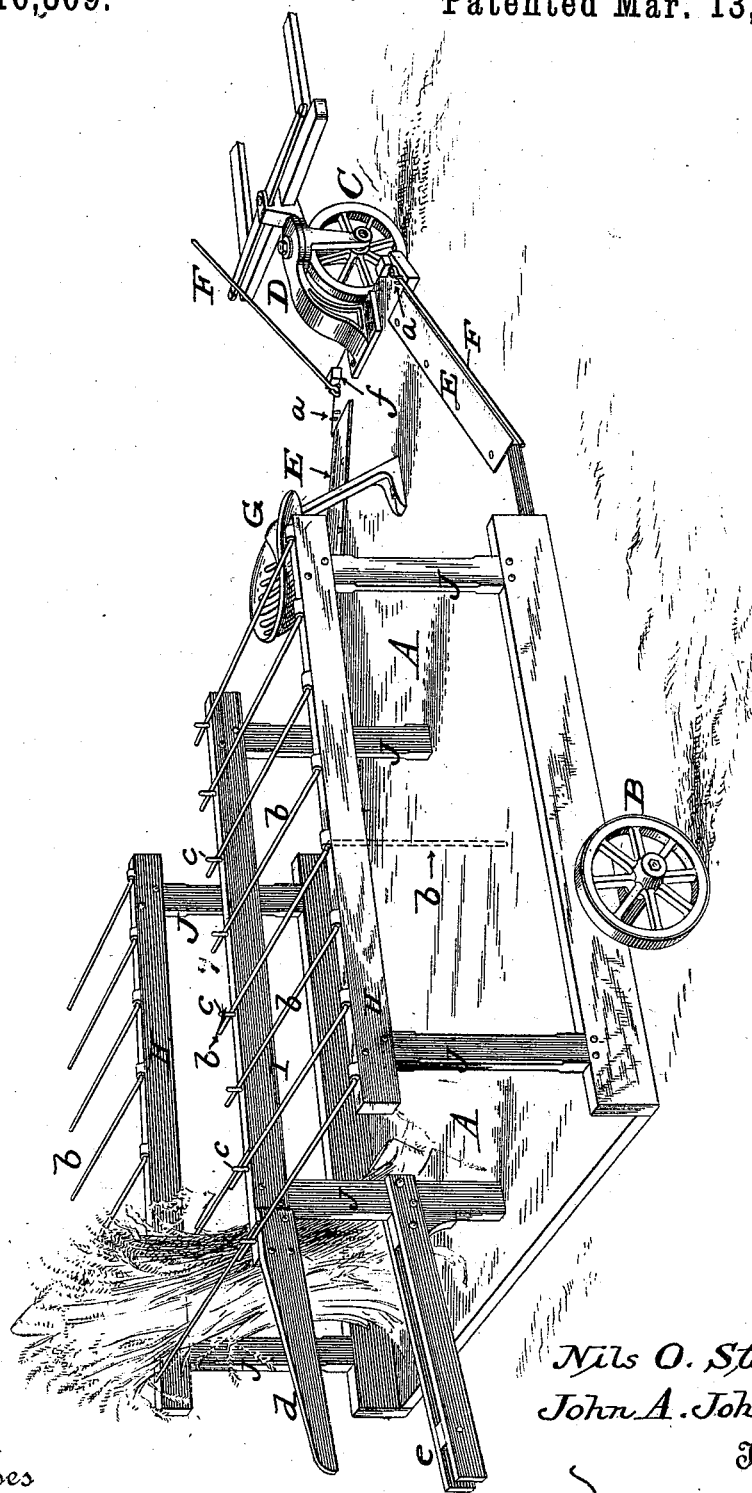
Figure 2:
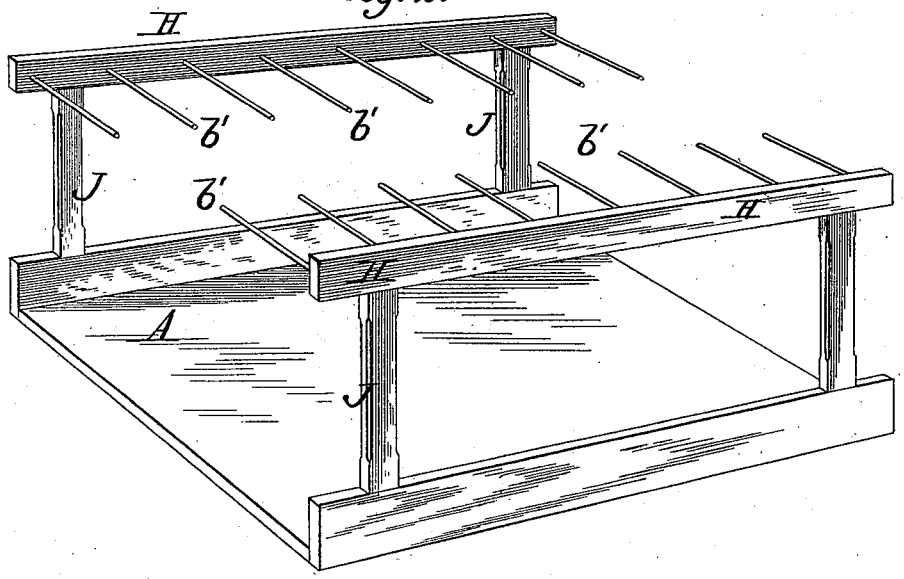
Figure 3:
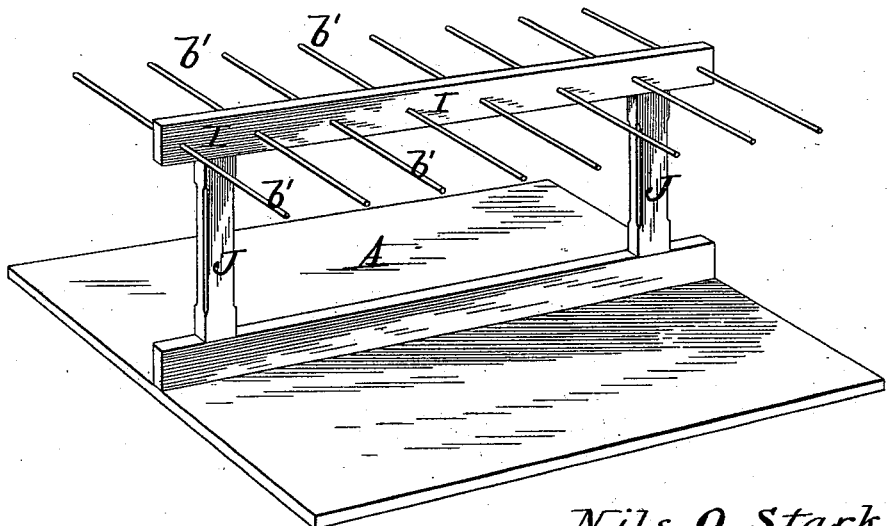

In the drawings,—Figure 1 is a perspective view of our improved machine; and Figs. 2 and 3, perspective views of two modified forms of racks either of which may be substituted for that illustrated in Fig. 1.

A indicates the main frame or body of the machine, supported at the front and rear by suitable wheels B, C, the said forward wheel being carried in a yoke or fork which is swiveled to the forwardly projecting arm D, and connected with the draft. The sides of the frame are inclined at the forward end, and to such inclined faces are applied the cutting blades or knives E, which, as the machine is drawn along, sever or cut the standing corn.

A guard comprising merely a rod or bar F with an eye or hinge at one end, is mounted upon the main frame, in proximity to each cutter. When the machine is not cutting, the guard bar is placed along the edge of the cutting blade, said bar or guard being held in this position by means of two pins or stops $a\,a$ on the main frame. When the machine is at work, the guard is lifted vertically from between the pins or stops and supported upon blocks or supports $f$, or they may be swung laterally or inward to rest upon the frame. In Fig. 1 we have shown one of these guards in one position and the other one in the other position.

In using this machine the driver occupies the seat G while two attendants, one at each side, stand in rear of the knives to gather the corn as it is cut by said knives. These attendants gather the corn by armfuls and place it upon the main frame until a sufficient quantity to form a shock has been gathered. It is desirable, however, that means be provided for properly sustaining or supporting the corn as the cutting progresses, for if the corn be thrown indiscriminately upon the frame or platform, much time and labor are required in arranging it for shocking. In order to avoid this objection we provide the frame or platform with a rack which may be built into the machine as a part of the frame, or made removable, as may be preferred. There are many ways in which this rack may be constructed, three different forms being represented. In the preferred form, represented in Fig. 1, there are three longitudinal bars or timbers H H and I, supported upon suitable posts or uprights J, said bars being separated from one another a sufficient distance to permit the attendants to pass between them. Hinged or pivoted to the bars H H are the arms $b$ which are of such length as to rest upon or be supported by the intermediate bar I, these arms and the bars thus forming distinct, stationary compartments into which the armfuls of corn are placed as gathered. Arms $b$ are designed to swing upward and outward,—see left side of machine, Fig. 1,— so as to permit the attendants to pass to the rear of the machine to deposit the first armful gathered in the rearmost compartment. When the attendant has placed the armful of corn against the first or rearmost arm $b$, he then swings the second arm down as shown in Fig. 1, thus holding the bundle of corn while he walks to the front of the machine to gather another bundle. When this second bundle has been placed against the second arm, the third arm is swung down upon bar I, and thus a second compartment is formed. This operation is repeated until the requisite number of bundles is placed upon the main frame.

In Fig. 1 the arms $b$ are shown as projecting outward horizontally from the bar H, when they are not in use; but by moving the hinge block or pivot of said arms nearer to the outer edge of the said bars H, the arms $b$ will, when swung outward, hang vertically from the outer face of the bars, as illustrated in dotted lines. Pins or studs $c$ will advisedly be applied to the upper edge of bar I to prevent lateral movement of the arms $b$ when resting thereon. In the modification illustrated in Fig. 2, we omit the central bar I and employ arms $b'$, which are shorter than the arms shown in Fig. 1. Furthermore, under this modification, the arms are secured rigidly to the bars H instead of being pivoted thereto. In Fig. 3 we omit the side bars H H and use the centrally located bar I; said bar being provided upon its opposite faces with rigid laterally-projecting arms $b'$ similar to those in Fig. 2. Under any or all of these plans the bundles of grain will be maintained in separate compartments until the required quantity has been accumulated upon the platform, and this, too, regardless of any variation in the crop.

Most any desired number of arms $b\ b'$ may be employed, but fourteen,—seven on each side,—will be found to be enough, ordinarily.

After a quantity sufficient to form a shock has been gathered the machine is stopped, and the bundles are removed one by one and placed in position against the shock former at the rear of the machine. This shock-former comprises two rigid arms or bars $d$ and $e$, which project rearwardly from one of the posts or supports J, as shown in Fig. 1, the lower bar $e$, being made much thicker or wider than the upper bar $d$, so that when the bundles of grain are placed against the sides of said bars, the shock thus formed will be spread at the base to afford a good footing. After the grain has been thus placed against the arms $d\ e$, and tied, the machine is moved forward, and the shock-former withdrawn from the standing shock.

Having thus described our invention, what we claim is—

1. In a corn-harvester, the combination with the frame or platform upon which the bundles may rest; of a rack directly over the platform and provided at each side of the center of the machine with a plurality of separate bundle compartments to support the upper ends of the bundles.

2. In combination with the frame, the bars H H and I, and the arms $b$ pivoted to the bars H H and supported upon the bar I.

3. A corn-harvester provided with a rack comprising a longitudinal bar or bars and the pivoted dividing arms carried by said bar or bars.

In witness whereof we hereunto set our hands in the presence of two witnesses.

JOHN A. JOHNSON.
NILS O. STARKS.

Witnesses:
W. R. BAGLEY,
EDWARD F. APPLEBY.